No. 609,777. Patented Aug. 30, 1898.
G. J. CAPEWELL.
ROLLER BEARING.
(Application filed Apr. 11, 1896.)
(No Model.)
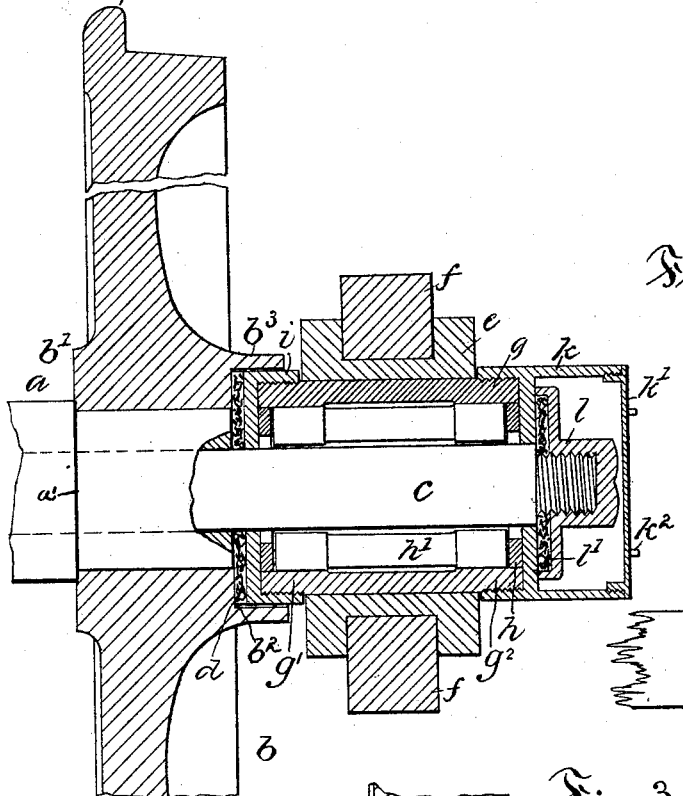
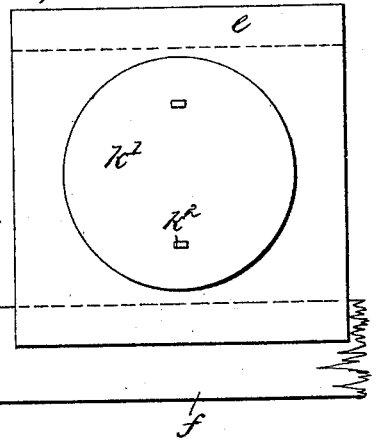
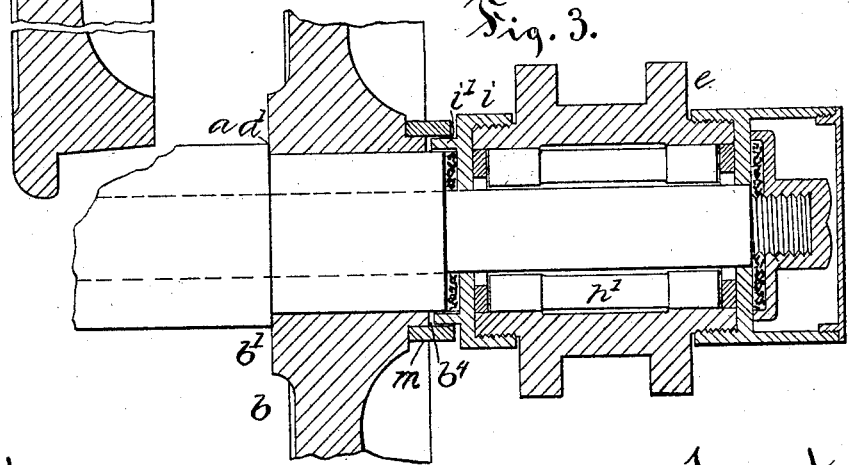
Witnesses.
Harris E. Hart.
Arthur B. Jenkins.
Inventor.
George J. Capewell.
by Chas. L. Burdett,
Attorney.
THE NORRIS PETERS CO., PHOTO-LITHO., WASHINGTON, D. C.

UNITED STATES PATENT OFFICE.

GEORGE J. CAPEWELL, OF HARTFORD, CONNECTICUT.

ROLLER-BEARING.

SPECIFICATION forming part of Letters Patent No. 609,777, dated August 30, 1898.

Application filed April 11, 1896. Serial No. 587,097. (No model.)

*To all whom it may concern:*

Be it known that I, GEORGE J. CAPEWELL, a citizen of the United States, and a resident of Hartford, in the county of Hartford and State of Connecticut, have invented certain new and useful Improvements in Roller-Bearings, of which the following is a full, clear, and exact description, whereby any one skilled in the art can make and use the same.

My invention is particularly applicable for use in connection with that class of roller-bearings described in my application for patent of the United States filed February 11, 1896, Serial No. 578,862, although applicable in some of its details to other forms of bearing.

The object of my invention is to provide means whereby the roller-bearings described in said application may be practically used in connection with railway-carriages or the like.

To this end my invention consists in the particular construction of the end of the axle used in my improved roller-bearing; and it further consists in the details of the several parts making up the device as a whole and in the combination of such parts, as hereinafter described, and more particularly pointed out in the claims.

Referring to the drawings, Figure 1 is a detail view, in central horizontal section, of a car-wheel and box embodying my improvement. Fig. 2 is a detail end view of the box. Fig. 3 is a detail view in central horizontal section, showing a modified form of the invention.

In the accompanying drawings, the letter $a$ denotes an axle, preferably made in the usual manner from iron rolled to shape, and on the end of this axle is secured in any well-known manner the wheel $b$. The journal $c$ is formed of hardened tool-steel and is secured to the axle in any suitable manner—in the present instance in a socket in the end of the axle. Any desired means may be used for holding the journal in place.

A hub $b'$ on the wheel rests against a shoulder $a'$ on the axle, and on the opposite side of the wheel from the hub a recess $b^2$ is formed, bounded by an annular flange $b^3$. The bottom of the recess $b^2$ is preferably formed on a line with the end of the axle, and an annular washer $d$, of rawhide or like material, is placed in the bottom of the recess, resting against the journal $c$ and end of the axle $a$.

A box or housing $e$ is supported between the arms $f$ of a pedestal commonly used in the construction of bearings for cars or the like, the housing being grooved on opposite sides, and the arms of the pedestals are located in these grooves, the housing having a vertical movement therein.

A bearing-case $g$ is located in the housing $e$ and is preferably formed of hardened steel or the like, and in this bearing-case is located the roller-bearing frame $h$, supporting the rollers $h'$.

A dust-cap $i$ is fitted upon the screw-threaded end $g'$ of the bearing-case $g$, that forms a flange projecting beyond the inner side wall of the housing $e$, the edge of this cap resting, preferably, against the housing and the edges of the opening through the cap resting against the journal $c$. This dust-cap is located, as to its greater part, in the recess $b^2$ in the hub of the wheel $b$ and against the rawhide washer $d$.

A flanged collar $k$ is secured to the outer projecting end of the bearing-case $g$ with its edge preferably resting against the housing $e$ and the edge of the central opening in the flange against the journal $c$, this collar $k$ forming a projecting flange from the outer side wall of the housing $e$. A dust-cap $k'$ is secured to the outer end of this collar, lugs $k^2$ on the cap serving as a means of turning it into place. A central lug of polygonal or other form may be used, if desired, for accomplishing this end.

A flanged nut $l$ is secured to the outer end of the journal $c$, with a washer $l'$ located within the flange and between the washer and the flange on the collar $k$.

In the modified form of the invention shown in Fig. 3 of the drawings the recess $b^4$ in the wheel-hub has its bottom wall formed back of the end of the axle, and a flange $i'$ on the dust-cap $i$ extends within the recess in the hub and between the wall of the recess and the side or periphery of the axle. This forms an additional means for preventing the entrance of dust or dirt into the roller-bearing. In this modified form of the invention instead of providing the roller-bearing frame of hardened steel the housing, made from cast-iron, is chilled as to its inner surface in the process of casting, the rollers $h'$ bearing on this chilled surface.

In Fig. 3 of the drawings has been shown a modified form of the manner of constructing the recess in the hub of the wheel, this consisting of a ring m, secured to the hub of the wheel in any convenient manner and extending beyond the end of the hub.

The feature of a journal secured to the end of the shaft, as herein illustrated and described, is especially applicable to shafts made in the form of a tube, on account of the readiness with which the journal may be secured to such a shaft.

The bearing-case g is shown and described herein as formed in a separate piece from the housing, this being a simple form of providing a hardened surface to resist the action of the rollers; but it is obvious that this same result may be differently attained and yet come within the scope of the invention.

I claim as my invention—

1. In combination in a roller-bearing, an axle, a wheel secured to the axle and having a flange forming a recess with the bottom wall in line with the end of the axle, a journal secured to the axle, a housing, a roller-bearing case located in the housing, rollers in contact with the journal and case, said case having its end projecting within the recess in the wheel, and a dust-cap secured to the inner end of the roller-bearing case, all substantially as described.

2. In combination with the pedestal-arms of a car-truck or the like, a housing movably supported between said arms, flanges projecting from each side of the housing, rollers located within the housing, a dust-cap connected with the flange at the outside of the housing, a dust-cap located on the flange at the inside of the housing and within a recess in the hub of a wheel secured to an axle, the axle having an end extending through the housing between the rollers and the wheel secured to the axle, and having a recess for the reception of the dust-cap, all substantially as described.

3. In combination with the pedestal-arms of a car-truck or the like, a housing movably supported between said arms, a roller-bearing case composed of hardened steel secured within the housing and with ends extending on each side thereof, rollers supported within the roller-bearing case, a dust-cap secured to the inner end of the roller-bearing case and extending into a recess formed in the hub of a wheel secured to an axle, the wheel secured to the axle and having a recess for the reception of the dust-cap, and the axle extending through the housing between the rollers, all substantially as described.

4. In combination with the pedestal-arms of a car-truck or the like, a housing movably supported between said arms, a roller-bearing case of hardened steel located within the housing, rollers supported within the roller-bearing case, an axle having a reduced end extending through the case between the rollers, a wheel secured to the axle and having a flange forming a recess the bottom wall of which is on a line with the end of the axle, a washer located at the bottom of said recess, and a dust-cap secured to the end of the projecting roller-bearing case and extending within the recess, all substantially as described.

5. In combination in a roller-bearing, an axle, a wheel secured to the axle and having a flange forming a recess, a journal secured to the axle, a roller-bearing case supporting the rollers in contact with the journal, said case having its end projecting within the recess in the wheel, the roller, and a dust-cap secured to the inner end of the roller-bearing case.

6. In combination with the pedestal-arms of a car-truck or the like, a housing movably supported between said arms and having a hardened surface, rollers located within the housing, an axle having a journal supporting the rollers, and a wheel secured to the axle and having a recess surrounding the end of the housing.

7. In combination with the pedestal-arms of a car-truck or the like, a housing movably supported between said arms, rollers located within the housing, an axle having a journal supporting the rollers, a wheel secured to the axle, and having a recess in the face of the hub, and a dust-cap secured to the housing and with a flange projecting into the recess in the face of the hub.

GEORGE J. CAPEWELL.

Witnesses:
CHAS. L. BURDETT,
ARTHUR B. JENKINS.